United States Patent [19]

Vukasovic

[11] 4,086,622

[45] Apr. 25, 1978

[54] FREQUENCY CONVERTER AND METHOD OF OPERATING SAME

[75] Inventor: Lovro Vukasovic, Erlangen, Germany

[73] Assignee: Siemens Aktiengesellschaft, Berlin and Munich, Germany

[21] Appl. No.: 721,694

[22] Filed: Sep. 9, 1976

[30] Foreign Application Priority Data

Sep. 18, 1975 Germany .............................. 2541700

[51] Int. Cl.² .......................................... H02M 5/45
[52] U.S. Cl. ...................................... 363/37; 363/49; 363/136
[58] Field of Search ................. 321/4, 14, 45 C, 45 S; 219/10.77; 363/37, 49, 136

[56] References Cited

U.S. PATENT DOCUMENTS

| 3,219,905 | 11/1965 | Davis et al. | 321/45 C |
| 3,657,634 | 4/1972 | Eastop | 321/45 S |
| 3,757,197 | 9/1973 | Bailey | 219/10.77 |
| 3,872,364 | 3/1975 | Hübner | 321/45 C |
| 3,947,748 | 3/1976 | Klein | 321/14 |

*Primary Examiner*—William M. Shoop
*Attorney, Agent, or Firm*—Kenyon & Kenyon, Reilly, Carr & Chapin

[57] ABSTRACT

A parallel resonant circuit frequency converter having input terminals of its inverter bridged by an auxiliary commutating arrangement which consists of a bridge circuit of thyristors, the a-c outputs of which are connected to a capacitor in which thyristors of the auxiliary commutating arrangement are fired until a predetermined capacitor voltage is reached to start up the frequency converter, the thyristors of the inverter then fired until a current of predetermined magnitude flows, which is kept contant by control of the rectifier, and subsequently, the thyristors of the auxiliary commutating arrangement are fired prior to each zero crossing of the resonant circuit voltage and, the thyristors of the inverter, delayed by a constant time span, are fired until the resonant circuit voltage has reached a predetermined value.

1 Claim, 3 Drawing Figures

FREQUENCY CONVERTER AND METHOD OF OPERATING SAME

BACKGROUND OF THE INVENTION

This invention relates to frequency converters in general more particularly to an improved frequency converter and method of operating same.

One known type of frequency converter comprises an inverter with controlled converter valves in a bridge circuit, the output terminals of which are connected to a parallel resonant circuit and the input terminals of which are connected to an a-c voltage source, via an intermediate d-c link having a smoothing choke and a controlled rectifier with the input terminals of the inverter bridged by an auxiliary commutating arrangement which contains thyristors in a bridge circuit and having capacitor connected across its the a-c outputs. A method for operating, and in particular, starting up such a frequency converter includes, during the start-up phase, firing thyristors of corresponding diagonal bridge arms of the inverter and of the auxiliary commutating device prior to every zero crossing of the resonant circuit voltage and, after the conclusion of the start-up phase, firing only thyristors of diagonal bridge arms of the inverter while the thyristors of the auxiliary commutating arrangement remain unfired.

Such a frequency converter and such an operating procedure are known from the German Offenlegungsschrift No. 2,056,847. In the steady state condition, frequency converters having parallel resonant circuit as the load are load controlled and the operating frequency of the inverter is determined by the resonance frequency of the resonant circuit. The current passes in direct commutation from one bridge arm of the inverter to the next one that carriers current, the reactive commutation power being supplied by the capacitor of the parallel resonant circuit. In the start-up phase, the charge of the capacitor is not sufficient for direct commutation and indirect commutation is necessary during this time. In the know frequency converter, an auxiliary commutating arrangement is provided for this purpose. This auxiliary commutating arrangement consists of a capacitor which can be replenished by a d-c voltage source and which is connected in series with the d-c terminals of the bridge circuit of thyristors. The a-c terminals of the bridge circuit are connected via a choke and a further capacitor in series. In the known frequency converter, there is further provided as an initial current arrangement a thyristor and a capacitor in series, the latter being shunted by a resistor, and which likewise bridges the input terminals of the inverter. For starting up, the thyristor of the initial current arrangement is fired in the known frequency converter until a current of predetermined magnitude flows in the smoothing choke. When this current is reached, thyristors of diagonal bridge arms of the inverter are fired; current now flows through the load and excites an oscillation, and the thyristor of the initial current arrangement is extinguished. Shortly before every zero crossing of the resonant circuit voltage, the previously non-conducting thyristors of the inverter and thyristors in the corresponding diagonal bridge arms of the auxiliary commutating arrangement are subsequently fired. The voltage of the rechargeable capacitor of the auxiliary commutating arrangement now is present as a negative cup-off voltage at the thyristors of the inverter and extinguishes the thyristors which had heretofore been conducting. Now, the voltage at the capacitor of the bridge circuit of the auxiliary commutating arrangement rises until the fired thyristors of the inverter can take over the current, whereupon the current carrying thyristors of the auxiliary commutating arrangement are extinguished. A choke which is connected in series with this capacitor is required for this voltage rise at the capacitor of the bridge circuit. This switching cycle is repeated shortly before every following zero crossing of the resonant circuit voltage. In the process, the capacitor of the bridge circuit of the auxiliary commutating arrangement is charged more and more and its voltage counteracts the voltage of the rechargeable capacitor, so that the auxiliary commutating arrangement becomes ineffective after a certain period of time, whereby the start-up phase is concluded, since now the resonant circuit voltage of the inverter is sufficient for direct commutation and the frequency converter operates in the normal operating condition. The known frequency converter is not load controlled during the start-up phase but is self-commutating with the frequency of the resonant circuit voltage. However, this advantage is obtained at great expense. In particular, an additoional power supply is required for charging the capacitor in the auxiliary commutating arrangement.

Thus, there is a need to simplify a frequency converter of the type mentioned above and at the same time to improve its operation during the start-up phase.

SUMMARY OF THE INVENTION

According to the present invention, this problem is solved by providing that the auxiliary commutating arrangement consists only of the bridge circuit of thyristors and its a-c outputs are only connected to the capacitor.

With the frequency converter according to the present invention, an additional power supply for indirect commutation during the start-up phase is not required. Furthermore, compared to the known frequency converter, the choke in the auxiliary cummutating arrangement is saved and the auxiliary commutating arrangement can be designed for only a fraction of the resonant circuit power, for which reason a capacitor of small capacity and thyristors of low rating can be used in the auxiliary commutating arrangement. In addition, the initial current arrangement of the known frequency converter is not needed. The frequency converter according to the present invention can therefore by manufactured at considerably lower cost.

In an advantageous method for operating and, in particular, starting up the frequency converter according to the present invention, thyristors in two diagonal bridge arms of the auxiliary commutating arrangement are fired at the start of the operation and remain conducting until the voltage at the capacitor of the auxiliary commutating arrangement has reached a predetermined value. When this voltage is reached, thyristors in two diagonal bridge arms of the inverter are fired and remain conducting until a current of predetermined magnitude flows, which is kept constant during the entire start-up phase by controlling the rectifier. After this current is reached, the thyristors of bridge arms of the auxiliary commutating arrangement which next carry current are fired and, after a constant time delay, the thyristors of bridge arms of the inverter which next carry current are fired, the time delay being dependent on the voltage and the current of predetermined magnitude. Subsequently, thyristors of bridge arms of the auxiliary commutating device are fired prior to every zero crossing and, after a constant time delay, the corresponding thyristors of the inverter. This switching cycle is continued until a resonant circuit voltage of predetermined magnitude which is sufficient for direct commutation is reached.

With this operating procedure according to the present invention, soft starting of the frequency converter is achieved, while the control is simplified. During the start-up, no additional actual value pickup is necessary. Instead, the measurement data required for control are obtained with the measuring sensors required for the control in normal operation. This permits the protection time for the firing of the thyristors of the inverter to also be taken into consideration. In addition, because of the setting of the constant initial current by the inverter rectifiers, the frequency converter operates independently of the current and can start up with different loads.

DETAILED DESCRIPTION OF THE INVENTION

Figure 1:
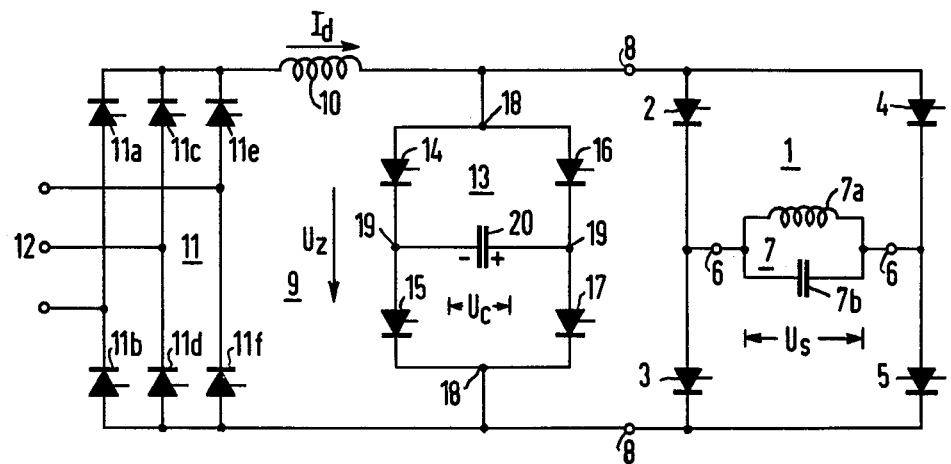
FIG. 1 is a schematic diagram of a first frequency converter circuit according to the present invention.

FIG. 1 illustrates the circuit of a frequency converter according to the present invention. An inverter 1 is constructed from thyristors 2, 3, 4 and 5 in a single phase bridge circuit. A parallel resonant circuit 7 which consists of a choke 7a and a capacitor 7b in parallel and acts as the load, is fed from the output terminals of a-c leads 6 of the inverter 1. The input terminals 8 of the inverter 1 are connected to a three phase network, which is connected to the terminals 12 via an intermediate d-c link 9 including smoothing choke 10 and a rectifier 11. The rectifier 11 is constructed of thyristors 11a to 11f in a threephase bridge circuit. The input terminals 8 of the inverter 1 are bridged by an auxiliary commutating arrangement 13, which is constructed from thyristors 14 to 17 in a bridge circuit. The d-c terminals 18 of the bridge circuit are connected to the input or d-c terminals 8 of the inverter 1 and the a-c terminals 19 of the bridge circuit to a capacitor 20. Control devices which are not shown in the figure in order to preserve the clarity of the presentation must be provided, for the thyristors 2 to 5, 11a to 11f and 14 to 17 of the inverter 1, the controlled rectifier 11 and the auxiliary commutating arrangement 13. Such control units for a rectifier are described, for instance, in a bood by G. Moeltgen entitled "Line Commutated Thyristor Converters", Siemens AG, Pitman Publishing, London, 1972, pages 301 to 307 and for an inverter, for instance, in the book by D. Ernst and D. Stroele, "Industrieelektronik", Springer-Verlag, 1973, pages 54 and 55. The last-mentioned control unit can also be used for firing the thyristors of the auxiliary commutating arrangement. Current transformers must further be provided in the feed line of the rectifier 11 and a voltage pickup at the resonant circuit 7 as actual value pickups for the control devices. These actual value pickups, which are also required for the normal operation of the frequency converter, are not shown in the figure. They are described, for instance, in the above mentioned German Offenlegungsschrift, No. 2,056,847.

In the normal operating condition, the thyristors 2 and 5 or 3 and 4 of the diagonal bridge arms of the inverter 1 are alternatingly fired at the frequency of the resonant circuit voltage of the parallel resonant circuit 7. The firing takes place, taking into consideration the protection time of the thyristors, shortly before each zero crossing of the resonant circuit voltage. The commutation from one converter arm to the converter arm that conducts next is accomplished directly, the reactive commutation power being supplied by the capacitor 7b of the parallel resonant circuit 7. In the start-up phase, the charge of the capacitor 7b is not sufficient for direct commutation. In this operating condition, indirect commutation is therefore necessary; at the same time, care must be taken that the resonant circuit capacitor 7b is charged as fast as possible to a level which is sufficient for direct commutation, so that normal operation can take place. The operation of the frequency converter according to FIG. 1 in the start-up phase will be explained in detail with the aid of FIG. 2, where the current $I_d$ in the smoothing choke, the intermediate-link voltage $U_z$ at the input or d-c terminals 8 and the resonant circuit voltage $U_s$ at the capacitor 7b of the parallel resonant circuit 7 are plotted versus time t. At the start of the operation, the thyristors 14 and 17 or 15 and 16 in two diagonal bridge arms of the auxiliary commutating arrangement 13 are fired. In the following, it will be assumed that the thyristors 15 and 16 were fired. The thyristors remain conducting for a time span $\Delta t_1$, until a voltage $U_{co}$ of the polarity indicated in the figure is reached at the capacitor 20. At the end of the time span $\Delta t_1$, i.e., when the voltage $U_{co}$ is reached, the thyristors 2 and 5 or 3 and 4 in two diagonal arms of the inverter bridge 1 are fired. In the following, it will be assumed that the thyristors 2 and 5 have been fired. These thyristors 2 and 5 remain conducting for a time span $\Delta t_2$, during which an initial current $I_{do}$ is measured, for instance, by the current transformers, not shown, in the feed line of the rectifier 11 and is kept constant during the entire start-up phase by controlling the thyristors 11a to 11f of the rectifier 11. When the current has reached the predetermined magnitude $I_{do}$, the thyristors 14 and 17 in bridge arms of the auxiliary commutating arrangement 13, which conduct next, are fired. The voltage of the capacitor 20 is now present as a negative cut-off voltage at the thyristors of the inverter 1 and the current carrying thyristors 2 and 5 are cut off. In a constant time span $\Delta t_o$, the voltage of the capacitor 20 is revervsed from $-U_{co}$ to $+U_{co}$. This time span is given by the capacity $C_{13}$ of the capacitor 13, and the voltage $U_{co}$ and the current $I_{do}$ according to the relation:
$$t_o = 2 U_{co} \cdot C_{13} / I_{do}.$$

Figure 2:
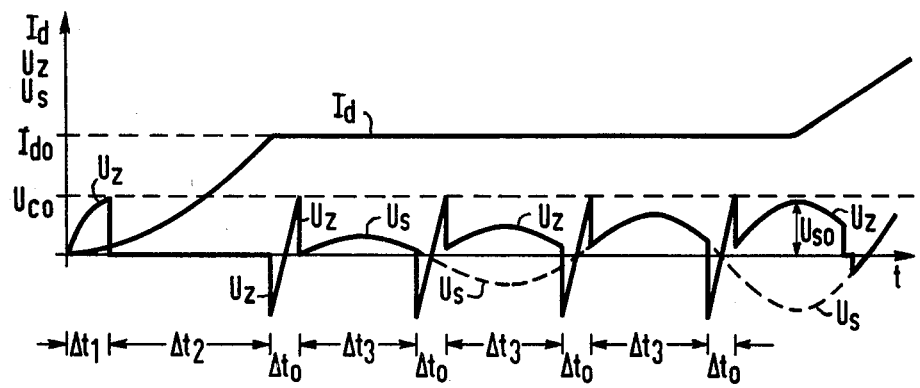
FIG. 2 is a wave form diagram helpful in understanding the operation of the circuit of FIG. 1.

After the charge reversal, i.e., at the end of the constant time span $\Delta t_o$, the thyristors of the bridge arms of the inverter 1 which conduct next, are fired and take over the current, and the current carrying thyristors 15 and 16 are extinguished. Now, current flows through the load 7, charges the capacitor 7b and excites an oscillation in the parallel resonant circuit. At the end of a time span $\Delta t_3$ dependent on the oscillation frequency, the thyristors 15 and 16 of the next following bridge arms of the auxiliary commutating arrangement 13 are fired shortly before or at the zero crossing of the resonant circuit voltage $U_s$ and, after the constant firing delay, the thyristors 2 and 4 of the inverter 1 fired. The exact point in time of firing depends on the protection time for the thyristors of the inverter 1. The indirect commutation so released takes place in the manner described above. At the end of the time span $\Delta t_3$, i.e., before the next zero crossing of the resonant circuit voltage $U_s$, this switching cycle is repeated and is continued, while the resonant circuit voltage $U_s$ becomes larger and larger, as is shown in FIG. 2, until it has reached a value of predetermined magnitude $U_{so}$ which is sufficient for direct commutation. Then the thyristors 14 and 17 of the auxiliary commutating arrangement 13 remain unfired, normal operation begins and the current $I_d$ is no longer kept constant but increases. It should be mentioned that only a few switching cycles are shown in FIG. 2. In actuality, the indirect commutation in the start-up phase is repeated considerably more often. It should further be noted that the method according to the present invention, in which the charge of commutating capacitors is reversed during a constant time span which depends on a constant initial current and the initial charge of the commutating capacitors, can also be used for cycloconverters with a modified auxiliary commutating arrangement.

Figure 3:
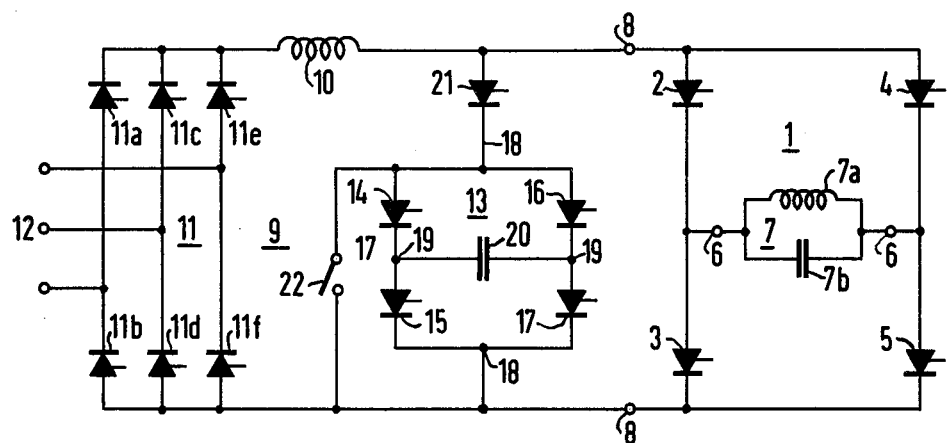
FIG. 3 is a schematic diagram of a second frequency converter circuit according to the present invention.

FIG. 3 shows a modification of the embodiment of FIG. 1. In this embodiment, a thyristor 21 is connected in series with the auxiliary commutating arrangement 13. This thyristor is also fired with each firing of the thyristors 14 to 17. Its purpose is to take over the full resonant circuit voltage in normal operation, after the start-up phase. The thyristors 14 to 17 can therefore be designed for considerably less voltage stress, which reduces the cost of the installation further. In addition, a switch 22 is connected parallel to the auxiliary commutating arrangement 13 in the embodiment of FIG. 3. This switch 22 acts as overvoltage protection and is closed if the resonant circuit voltage exceeds a given value, a thyristor 21 being used to short-circuit the thyristors 2 to 5 of the inverter 1.

In summary, it can be stated that, through the frequency converter according to the present invention, the start-up is considerably simplified and improved; it should be emphasized again that the starting takes place very softly. Furthermore, an additional power supply is not required for the indirect commutation during the start-up phase and only those variables which must also be picked up for normal operation are required for firing and controlling so that no additional measuring sensors are necessary for starting up, which simplifies the design and the control considerably. In addition, the auxiliary commutating arrangement can be designed for a fraction of the resonant circuit power, i.e., the thyristors of the auxiliary commutating arrangement need only have a low rating and the commutating capacitor may be chosen small, for instance, in the order of 5 uF.

What is claimed is:

1. A method, for operating a frequency converter comprising an inverter having thyristors in a bridge circuit, the output terminals of which are connected to a parallel resonant circuit and the input terminals of which are connected to an a-c voltage source through an intermediate d-c link containing a smoothing choke and a controlled rectifier with the input terminals of the inverter bridged by an auxiliary commutating arrangement comprising only a bridge circuit of thyristors the a-c outputs of which are coupled only across a capacitor including, during the start-up phase, firing thyristors of corresponding diagonal bridge arms of the inverter and of the auxiliary commutating device prior to every zero crossing of the resonant circuit voltage and, after the conclusion of the start-up phase, firing only thyristors of diagonal bridge arms of the inverter while the thyristors of the auxiliary commutating arrangement remain unfired, comprising the steps of:
  (a) firing the thyristors in two diagonal bridge arms of the auxiliary commutating arrangement at the start of the operation and maintaining said thyristors conducting until the voltage at the capacitor of the auxiliary commutating arrangement has reached a first predetermined magnitude;
  (b) firing the thyristors in two diagonal bridge arms of the inverter when said voltage magnitude is reached and maintaining conduction until a current of predetermined magnitude flows;
  (c) maintaining said current constant during the entire start-up phase by controlling the rectifier;
  (d) after said current magnitude is reached, firing the thyristors of bridge arms of the auxiliary commutating arrangement that conduct next;
  (e) after a constant time delay firing the thyristors of bridge arms of the inverter that conduct next, said time delay depending on the voltage and the current of predetermined magnitude;
  (f) subsequently, prior to every zero crossing of the resonant circuit voltage firing the thyristors of bridge arms of the auxiliary commutating arrangement and, delayed by said constant time delay, firing the corresponding thyristors of the inverter; and
  (g) continuing this switching cycle until a resonant circuit voltage of second predetermined magnitude which is sufficient for direct communication is reached.

* * * * *